United States Patent [19]

Kitahara et al.

[11] Patent Number: 5,670,445

[45] Date of Patent: Sep. 23, 1997

[54] CLEANING AGENT OF HARMFUL GAS AND CLEANING METHOD

[75] Inventors: Koichi Kitahara; Kenji Otsuka; Toshiya Hatakeyama; Hideki Fukuda, all of Kanagawa, Japan

[73] Assignee: Japan Pionics Co., Ltd., Tokyo, Japan

[21] Appl. No.: 409,031

[22] Filed: Mar. 23, 1995

[30] Foreign Application Priority Data

Mar. 24, 1994 [JP] Japan ................................ 6-079963
May 9, 1994 [JP] Japan ................................ 6-119570

[51] Int. Cl.$^6$ .......................... B01J 20/02; B01J 23/40; B01J 23/42; B01J 23/58

[52] U.S. Cl. .................. 502/406; 502/328; 502/326; 423/240 S

[58] Field of Search ................. 423/245.1, 239.1, 423/210, 240 S; 134/1, 40; 427/560; 502/406, 328, 326; 505/823; 208/262.1

[56] References Cited

U.S. PATENT DOCUMENTS 4,166,748  9/1979  Cassens ............................. 106/66
4,594,231  6/1986  Nishino et al. .................... 423/210

FOREIGN PATENT DOCUMENTS 0261950  3/1988  European Pat. Off. .

*Primary Examiner*—Elizabeth D. Wood
*Assistant Examiner*—Tanaga A. Boozer
*Attorney, Agent, or Firm*—Sughrue, Mion, Zinn, Macpeak and Seas

[57] ABSTRACT

A cleaning agent for removing acidic gases which are harmful materials from a harmful gas containing such acidic gases, and a cleaning method using the cleaning agent are disclosed. The cleaning agent comprises a molded product of a composition comprising strontium hydroxide and an iron oxide, and the harmful gas is passed through a cleaning column packed with the cleaning agent to contact the harmful gas with the cleaning agent, thereby removing the acidic gases from the harmful gas.

8 Claims, No Drawings

CLEANING AGENT OF HARMFUL GAS AND CLEANING METHOD

FIELD OF THE INVENTION

The present invention relates to a cleaning agent of a harmful gas and a cleaning method, and more particularly to a cleaning agent of a harmful gas containing acidic gases such as boron trichloride, chlorine, hydrogen chloride, hydrogen bromide, boron trifluoride, hydrogen fluoride, chlorine trifluoride, fluorine, etc., discharged after being used mainly in a semiconductor production step, etc., and a cleaning method using the cleaning agent.

Background of the Invention

Recently, with the development of the semiconductor industries and optoelectronics industries, the kind and the use of acidic gases such as boron trichloride, chlorine, hydrogen chloride, hydrogen bromide, boron trifluoride, tungsten hexafluoride, silicon tetrafluoride, chlorine trifluoride, hydrogen fluoride, fluorine, etc., have been increased.

These gases are indispensable materials for forming crystalline silicon, amorphous silicon, or a silicon oxide layer or film, or as etching gases, in the production industries of silicon semiconductors and compound semiconductors, and are generally used by diluting with hydrogen, nitrogen, argon, helium or the like. However, since these gases all have a high toxicity and give bad influences on the human body and environment, it is necessary to clean the harmful gas containing these acidic gases before releasing in the atmosphere after using in the semiconductor production step, etc.

Further, gases having a small hydrolyzing property and a relatively small toxicity, such as carbon tetrafluoride, perfluoropropane, sulfur hexafluoride, etc., are also used for dry etching of a silicon layer, a silicon oxide layer, etc., in a semiconductor production step. Since the gas discharged through the etching step contains harmful components formed by the reaction of the gas and the above layer component and the decomposition of the gas, such as silicon tetrafluoride, fluorine, etc., it is necessary to clean the gas in discharging the gas from the step to the outside.

Hitherto, as a means for removing the acidic gases such as hydrogen chloride, hydrogen fluoride, boron trichloride, boron trifluoride, silicon tetrafluoride, etc., which are contained in the harmful gas, there are known a wet method of absorption-decomposing by contacting the harmful gas with an aqueous solution of an alkali such as sodium hydroxide, etc., using a scrubber, a spray tower, a rotary fine bubble generating apparatus, etc., as described in JP-A-61-204022, JP-A-62-125827, etc., (the term "JP-A" as used herein means an "unexamined published Japanese patent application") and a dry method of cleaning the harmful gas by passing the gas through a packed column packed with a solid material, for example, an adsorbent such as an oxide, a carbonate, etc., of magnesium, sodium, potassium, etc., as described in JP-A-63-232844, an adsorbent formed by impregnating activated carbon with a zinc compound, an alkali metal compound, etc., as described in JP-A-60-68051, and a cleaning agent which uses soda lime as the effective component.

However, the wet method involves the problems that not only the post treatment is difficult and the apparatus is complicated and becomes large but also large costs are required for the equipments and the management thereof.

On the other hand, the dry method has the problem that the adsorbent such as the oxides, carbonates, etc., of magnesium, sodium, potassium, etc., has a small removability per unit volume of the adsorbent.

Further, the cleaning agent using the adsorbent formed by impregnating activated carbon with a zinc compound, an alkali metal compound, etc., does not always have a sufficient removal capacity, and when the concentration of the acidic gas is high or the amount of the acidic gas is large, there is a problem that the harmful gas containing the acidic gas cannot be treated sufficiently, and the adsorbent using activated carbon also has the problem that it sometimes happens to form an inflammable material in the case of a gas having a very high reactivity, such as fluorine and there is a possibility to cause a fire.

Furthermore, soda lime has a removability slightly larger than those of the above-described adsorbents but where a chlorine-based gas such as hydrogen chloride, chlorine, boron trichloride, etc., is passed therethrough, potassium chloride having a remarkable deliquescence is formed, causing a problem that the kind of gases suitable for cleaning by the adsorbent is restricted.

Accordingly, the development of a cleaning agent of harmful gases, which shows a large treatment speed and a large treatment capacity of harmful gases, is usually excellent in the removability of various acidic gases which are discharged from a semiconductor production process, gives no possibility of causing a fire in cleaning, and does not cause clogging the cleaning column by the deliquescence thereof, and a cleaning method has been desired.

SUMMARY OF THE INVENTION

As a result of various investigations to overcome these problems described above, it has been found that by using a mixture of strontium hydroxide and an iron oxide as the main component of a cleaning agent, the cleaning agent has a very large removability for removing acidic gases discharged from a semiconductor production step, etc., gives no possibility of causing a fire and clogging, and has an excellent safety. The present invention has been completed based on this finding.

Accordingly, one object of the present invention is to provide a cleaning agent of a harmful gas for removing harmful acidic gases from a gas containing the harmful acidic gases, comprising a molded product of a composition comprising strontium hydroxide and an iron oxide as the main components.

Another object of the present invention is to provide a cleaning method of a harmful gas containing acidic gases by removing the acidic gases from the harmful gas, which comprises packing a cleaning agent in a cleaning column having an inlet and an outlet for the gas, and flowing the harmful gas through the cleaning column to contact the harmful gas with the cleaning agent, the cleaning agent comprising a molded product of a composition comprising strontium hydroxide and an iron oxide as the main components.

DETAILED DESCRIPTION OF THE INVENTION

The cleaning agent of the present invention is applied for cleaning a harmful gas containing acidic gases, particularly halogen-based acidic gases contained in an exhaust gas discharged from a semiconductor production process.

The harmful gas to be cleaned in the present invention is a gas comprising nitrogen, argon, helium, hydrogen, or air and contained therein at least one kind of acidic gases such as boron trichloride, chlorine, hydrogen chloride, hydrogen bromide, boron trifluoride, tungsten hexafluoride, silicon tetrafluoride, hydrogen fluoride, chlorine trifluoride, fluorine, etc.

A composition obtained by mixing strontium hydroxide and iron oxide as the main components is used as the cleaning agent of the present invention.

Strontium hydroxide [$Sr(OH)_2$] can be produced by, for example, the reaction of strontium chloride and sodium hydroxide, but strontium hydroxide in the form of the octahydrate, etc., having a purity of at least 98% is commercially available and such a commercially available product can be usually used.

Where strontium hydroxide is in the form of the octahydrate, the product may be used as it is, but when the product is heated to about 80° C., a stable monohydrate is relatively easily obtained and hence strontium hydroxide may be used in the form corresponding to the monohydrate, or strontium hydroxide may be also used in the form of an anhydride which does not have water of crystallization.

Examples of the iron oxide used in the present invention are tri-iron tetroxide (iron(II) iron(III) oxide) [$Fe_3O_4$], iron (II) oxide [$FeO$], iron(II) hydroxide [$FeO.H_2O$] which is the monohydrate of the iron(II) oxide, iron(III) oxide [$Fe_2O_3$], iron(III) hydroxide [$FeO(OH)$], etc., and they can be obtained as follows.

(1) Tri-iron tetroxide can be produced by, for example, oxidizing iron(II) hydroxide with sodium hydroxide and nitric acid, the iron(II) hydroxide being formed by blowing ammonia into iron(II) sulfate, but since tri-iron tetroxide having a purity of at least 95% is commercially available as iron black, the commercially available product can be usually used.

(2) Iron(II) oxide can be obtained by, for example, reducing iron(III) oxide with hydrogen, heating iron under a low oxygen partial pressure, heating iron(II) oxalate under an air free condition, or heat-drying iron(II) hydroxide under an inert gas atmosphere.

(3) Iron(II) hydroxide can be obtained by, for example, reacting iron(II) sulfate or iron(II) chloride with sodium hydroxide.

(4) Commercially available products can be usually used as iron(III) oxide, iron(III) hydroxide, etc.

Of those, iron(II) oxide and iron(II) hydroxide are generally unstable compounds and it is difficult to obtain the iron oxide or the iron hydroxide having a high purity, but the iron oxide or the iron hydroxide is not necessary to have a high purity and may contain other iron oxide without accompanying any problem. Iron(II) oxide and iron(II) hydroxide are usually stored under the condition which avoids the contact with air as far as possible, and it is preferred that the treatment thereof is carried out in an inert gas atmosphere using a gloved box, etc.

These iron oxides may be used alone or as mixtures thereof. In general, iron oxides containing large amounts of tri-iron tetroxide, iron(II) oxide and iron(II) hydroxide are preferred, the iron oxides containing at least 60% by weight of tri-iron tetroxide are more preferred, and the iron oxides containing at least 80% by weight tri-iron tetroxide are most preferred.

The mixing ratio of strontium hydroxide and the iron oxide differs according to the kinds and the concentrations of the acidic gases contained in the harmful gas and cannot be definitely determined, but is usually from 15:1 to 1:12, preferably from 5:1 to 1:3, and more preferably from 2:1 to 1:2 as the atomic ratio of strontium to iron (Sr:Fe).

In the present invention, it is preferred that the cleaning agent contains an appropriate amount of water for the purpose of more increasing the cleaning ability for the harmful gas. In this case, the water content in the cleaning agent after molding is usually 60% by weight or less, and preferably from 5 to 40% by weight, including water which constitutes the hydrate of strontium hydroxide.

The cleaning agent is used in the form of a molded product. The cleaning agent may be obtained by molding the composition itself, may be obtained by molding a mixture of the composition and a carrier material such as alumina, silica, alumina silica, diatomaceous earth, etc., or may be obtained by applying the composition on the carrier material previously molded. Of these moldings, the molded product obtained by extrusion molding or tablet-molding the composition itself or a mixture of the composition and the carrier material is preferred, and the molded product of the composition itself without using any carrier is more preferred.

In molding, it is preferred to add to the composition one or more of sodium hydroxide, potassium hydroxide, sodium silicate, polyvinyl alcohol, polyethylene glycol, polypropylene glycol, methyl cellulose, etc., as a binder for the purpose of increasing the molding property and the molding strength.

The amount of the binder added is determined by the proportions of the respective components in the composition, the molding conditions, etc., but is usually from 0.1 to 20 parts by weight, and preferably from 0.5 to 10 parts by weight, per 100 parts by weight of the composition.

The cleaning agent is prepared by various methods. For example, there are a method of adding an aqueous solution of a binder to a premixture of strontium hydroxide and the iron oxides at a predetermined proportion followed by stirring to obtain a slurry or cake, extrusion molding the slurry or the cake, cutting the resulting molded product to a proper length to obtain pellets, and drying the pellets in a dryer such that the water content becomes a desired content to obtain the cleaning agent, a method of drying the above-described slurry or cake, grinding the dried slurry or cake, and tablet-molding the ground slurry or cake, and a method of molding the above-described slurry or the cake into granules using a granulator.

Of these methods, the method of forming pellets by extrusion molding is generally preferred from the workability and the easiness of selecting the form and the size of the cleaning agent.

There is no particular restriction on the size and the form of the molded product, but the representative examples of the form are a spherical form, a columnar form, a cylindrical form, and a granular form. The size thereof is that the diameter is from 0.5 to 10 mm in the case of a spherical form, the diameter is from 0.5 to 10 mm and the height is from about 2 to 20 mm in the case of a columnar form such as pellets, tablets, etc., and the size is from about 0.84 to 5.66 mm as sieve opening in the case of an unfixed form such as granules, etc.

The cleaning method according to the present invention comprises packing the cleaning agent of the present invention in a cleaning column having an inlet and an outlet for the gas, flowing a harmful gas containing acidic gases through the cleaning column to contact the harmful gas with the cleaning agent, thereby removing the acidic gases from the harmful gas.

In the case of packing the molded product in a cleaning column, the bulk density is usually from about 0.6 to 2.0 g/ml.

The cleaning agent can be used as a moving bed or a fluidized bed in addition to a fixed bed, but is usually used as a fixed bed. The cleaning agent is packed in a cleaning column, and by passing a harmful gas containing the acidic gases through the inside of the cleaning column and contacting the gas with the cleaning agent, the acidic gases which are harmful components are removed.

There are no particular restrictions on the concentration of the acidic gas contained in the harmful gas and the flow rate of the harmful gas to which the cleaning agent of the present invention is applied, but it is generally preferred that the flow rate is decreased as the concentration is increased. Usually, the cleaning agent of the present invention is applied to the treatment of the harmful gas having the concentration of acidic gases of 20% by volume or less, but when the flow rate of the harmful gas is low, the cleaning agent can be applied to the treatment of the harmful gas containing acidic gases at a high concentration of more than 20% by volume.

The cleaning column is designed according to the concentration of the acidic gases, the amount of the harmful gas to be cleaned, the allowable pressure loss, and the like.

The packing length of the cleaning agent of the present invention in a cleaning column differs according to the flow rate of the harmful gas and the concentration of the acidic gases and cannot be specified definitely, but the packing length is usually from about 50 to 1,500 mm for practical use and the inside diameter of the cleaning column is designed such that the superficial linear velocity (LV) in a column of the harmful gas passing through the column becomes from about 0.01 to 150 cm/sec. In general, those are determined by the pressure loss of the packed layers, the contact efficiency of the harmful gas, and the concentration of the acidic gases.

The contact temperature at the operation is from 0° to 90° C., and preferably ordinary temperature (e.g., from 0° to 40° C.), and heating and cooling are not particularly required. In addition, after the initiation of the contact of the harmful gas and the cleaning agent, the temperature may somewhat rises by the reaction heat according to the kind, the concentration, etc., of the acidic gases, but since combustible materials such as activated carbon, etc., are not used in the cleaning agent of the present invention, there is no danger of causing a fire.

The pressure at the contact operation is usually atmospheric pressure, but the contact operation can be conducted at reduced pressure or under pressure of, for example, 1 kg/cm$^2$G.

There is no particular restriction on the humidity of the harmful gas to which the present invention is applied and the harmful gas may be in a dry state or in a wet state in an extent of not forming dews. In addition, where the harmful gas in a dry state is used, it sometimes happens that the cleaning ability is decreased according to the conditions of the temperature, the flow rate of the harmful gas, and the heat generated by the reaction with the cleaning agent. In such a case, it is preferred to give moisture to the harmful gas to be treated by supplying additionally a humidified gas to the inlet side of the cleaning column.

The present invention is described in more detail by reference to the following examples, but it should be understood that the invention is not construed as being limited thereto.

EXAMPLE 1

248 g of strontium hydroxide [Sr(OH)$_2$.8H$_2$O] having a purity of 99% was dried in a dryer at 80° C. for 18 hours to obtain 130 g of dry strontium hydroxide. The product had a weight corresponding to the weight of the monohydrate thereof.

To a mixture of 130 g of the dry strontium hydroxide and 54 g of tri-iron tetroxide (made by Kanto Kagaku K.K., purity 95%) at an atomic ratio of Sr/Fe=4/3 was added an aqueous solution of 4 g of sodium hydroxide (made by Kanto Kagaku K.K., purity 95%) dissolved in 172 g of water followed by mixing. In this case, the temperature of the mixture was raised to about 80° C. by the heat generated by the hydration of strontium hydroxide. The cake thus obtained was extrusion molded by an extrusion molding machine (manufactured by Fuji Poudal K.K.) through a nozzle plate having a nozzle diameter of 1.6 mm, the molded product was cut into pellets having lengths of from 3 to 5 mm, and the pellets were dried in a dryer at 80° C. for about 2 hours to obtain 102 g of a cleaning agent. The water content of the cleaning agent was 14.4% by weight and the bulk density thereof was 0.82 g/ml.

EXAMPLE 2

To a mixture of 130 g of the same dry strontium hydroxide as obtained in Example 1 and 54 g of tri-iron tetroxide was added an aqueous solution of 4 g of potassium hydroxide (made by Kanto Kagaku K.K., purity 85.5%) dissolved in 172 g of water followed by mixing. In this case, the same temperature rise by the heat of the hydration as in Example 1 was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hour to obtain 93 g of a cleaning agent. The water content of the cleaning agent was 14.4% by weight and the bulk density thereof was 0.85 g/ml.

EXAMPLE 3

To a mixture of the same dry strontium hydroxide as obtained in Example 1 and 54 g of tri-iron tetroxide was added 172 g of water followed by mixing. In this case, the same temperature rise by the heat of the hydration as in Example 1 was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hours to obtain 95 g of a cleaning agent. The water content of the cleaning agent was 16.4% by weight and the bulk density thereof was 0.77 g/ml.

EXAMPLE 4

To a mixture of 130 g of the same dry strontium hydroxide as obtained in Example 1 and 54 g of tri-iron tetroxide was added an aqueous solution of 4 g of sodium hydroxide dissolved in 172 g of water followed by mixing. In this case, the same temperature rise by the heat of the hydration as in Example 1 was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 1 hour to obtain 100 g of a cleaning agent. The water content of the cleaning agent was 28.8% by weight and the bulk density thereof was 0.91 g/ml.

EXAMPLE 5

To a mixture of 260 g of the same dry strontium hydroxide as obtained in Example 1 and 27 g of tri-iron tetroxide at an atomic ratio of Sr/Fe=16/3 was added an aqueous solution of 4 g of sodium hydroxide dissolved in 172 g of water followed by mixing. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hours to obtain 170 g of a cleaning agent. The water content of the cleaning agent was 14.2% by weight and the bulk density thereof was 0.78 g/ml.

EXAMPLE 6

To a mixture of 65 g of the same dry strontium hydroxide as obtained in Example 1 and 108 g of tri-iron tetroxide at an atomic ratio of Sr/Fe=1/3 was added an aqueous solution of 4 g of sodium hydroxide dissolved in 172 g of water followed by mixing. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from 3 to 5 mm, and the pellets were dried in a dryer at 80° C. for about 2 hours to obtain 100 g of a cleaning agent. The water content of the cleaning agent was 14.8% by weight and the bulk density thereof was 0.85 g/ml.

EXAMPLE 7

To a mixture of 130 g of the same dry strontium hydroxide as obtained in Example 1 and 54 g of tri-iron tetroxide was added an aqueous solution of 4 g of sodium hydroxide dissolved in 172 g of water followed by mixing. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 3 hours to obtain 110 g of a cleaning agent. The water content of the cleaning agent was 8.4% by weight and the bulk density was 0.79 g/ml.

EXAMPLE 8

To a mixture of 130 g of the same dry strontium hydroxide as obtained in Example 1 and 54 g of tri-iron tetroxide was added an aqueous solution of 4 g of sodium silicate (JIS K1408, No. 3) dissolved in 172 g of water followed by mixing. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hours to obtain 85 g of a cleaning agent. The water content of the cleaning agent was 16.4% by weight and the bulk density wad 0.85 g/ml.

EXAMPLE 9

The same pellets as obtained in Example 1 were dried in a dryer at 80° C. for 6 hours to obtain 90 g of a cleaning agent. The cleaning agent thus obtained did not substantially contain water, and the bulk density thereof was 0.70 g/ml.

EXAMPLE 10

In a gloved box having an inside argon atmosphere, 1 kg (3.6 moles) of commercially available iron(II) sulfate 7H$_2$O (made by Kanto Kagaku K.K.) was dissolved in 10 liters of water and after adding thereto a stoichiometric amount of a 20 wt % aqueous solution of sodium hydroxide, the resulting mixture was stirred to precipitate iron(II) hydroxide. The supernatant liquid was removed by decantation, and the precipitates remained were washed with water and then dried in a dryer having an inside argon atmosphere at 120° C. for 5 hours to obtain about 232 g of iron(II) oxide.

The preparation of a cleaning agent was carried out in a gloved box having an inside argon atmosphere.

That is, to a mixture of 130 g of dry strontium hydroxide and 50 g of iron(II) oxide obtained above at an atomic ratio of Sr/Fe=4/3 was added an aqueous solution of 4 g of sodium hydroxide dissolved in 172 g of water followed by mixing. In this case, the temperature was raised to 80° C. by the heat of the hydration of strontium hydroxide. The cake obtained was extrusion molded by an extrusion molding machine (manufactured by Fuji Poudal K.K.) through a nozzle plate having a nozzle diameter of 1.6 mm, the molded product was cut into pellets having lengths of from 3 to 5 mm, and the pellets were dried in a dryer at 80° C. for about 2 hours to obtain 95 g of the cleaning agent. The water content of the cleaning agent was 15.0% by weight and the bulk density thereof was 0.82 g/ml.

EXAMPLE 11

To a mixture of 260 g of the same dry strontium hydroxide as obtained in Example 1 and 25 g of iron(II) oxide prepared in Example 10 at an atomic ratio of Sr/Fe=16/3 was added an aqueous solution of 4 g of sodium hydroxide dissolved in 172 g of water followed by mixing. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hours to obtain 154 g of a cleaning agent. The water content of the cleaning agent was 18.0% by weight and the bulk density thereof was 0.80 g/ml.

EXAMPLE 12

To a mixture of 65 g of the same dry strontium hydroxide as obtained in Example 1 and 25 g of iron(II) oxide prepared in Example 10 at an atomic ratio of Sr/Fe=1/3 was added an aqueous solution of 4 g of sodium hydroxide dissolved in 172 g of water followed by mixing. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hours to obtain 98 g of a cleaning agent. The water content of the cleaning agent was 15.0% by weight and the bulk density thereof was 0.85 g/ml.

EXAMPLE 13

To a mixture of 130 g of the same dry strontium hydroxide as obtained in Example 1 and 62.8 g of commercially available iron(III) hydroxide (made by Kanto Kagaku K.K.) at an atomic ratio of Sr/Fe=4/3 was added an aqueous solution of 4 g of sodium hydroxide dissolved in 172 g of water. In this case, the temperature rise by the heat of the hydration of strontium hydroxide was observed. The cake obtained was extrusion molded by an extrusion molding machine through a nozzle plate having a nozzle diameter, the molded product was cut into pellets having lengths from about 3 to 5 mm, and the pellets were dried in a dryer at 80° C. for about 2 hours to obtain 103 g of a cleaning agent. The water content of the cleaning agent was 16.5% by weight and the bulk density was 0.80 g/ml.

EXAMPLE 14

To a mixture of 130 g of the same dry strontium hydroxide as obtained in Example 1 and 55.5 g of commercially available iron(III) oxide (made by Kanto Kagaku K.K.) at an atomic ratio of Sr/Fe=4/3 was added an aqueous solution of 4 g of sodium hydroxide dissolved in 172 g of water. In this case, the temperature rise by the heat of the hydration of strontium hydroxide was observed. The cake obtained was extrusion molded by an extrusion molding machine through a nozzle plate having a nozzle diameter of 1.6 mm, the molded product was cut into pellets having lengths of from about 3 to 5 mm, and the pellets were dried in a dryer at 80° C. for about 2 hours to obtain 98 g of a cleaning agent. The water content of the cleaning agent was 13.5% by weight and the bulk density was 0.82 g/ml.

EXAMPLE 15

To a mixture of 248 g of strontium hydroxide [$Sr(OH)_2 \cdot 8H_2O$] having a purity of 99% and 54 g of tri-iron tetroxide (made by Kanto Kagaku K.K., purity 95% or more) at an atomic ratio of Sr/Fe=4/3 was added an aqueous solution of 4 g of polyvinyl alcohol (PVA) (PA-05, trade name, made by Shin-Etsu Chemical Co., Ltd.) dissolved in 24 g of water followed by mixing. The cake obtained was extrusion molded by an extrusion molding machine (manufactured by Fuji Poudal K.K.) through a nozzle plate having a nozzle diameter of 1.6 mm, the molded product was cut into pellets having lengths of from about 3 to 5 mm, and the pellets were dried in a dryer by heating to 120° C. for about 12 hours to obtain 154 g of a cleaning agent. The water content of the cleaning agent was 12.6 and the bulk density was 0.68 g/ml.

EXAMPLE 16

The same procedure as in Example 15 was followed except that an aqueous solution formed by dissolving 4 g of polyethylene glycol (PEG, made by Kanto Kagaku K.K.) as a binder in place of polyvinyl alcohol (PVA) in 24 g of water was used, to obtain 150 g of a cleaning agent. The water content of the cleaning agent was 18.3% and the bulk density was 0.64 g/ml.

EXAMPLE 17

The same procedure as in Example 15 was followed except that 27 g of tri-iron tetroxide was mixed with 260 g of strontium hydroxide as an atomic ratio of Sr/Fe=16/3, to obtain 135 g of a cleaning agent. The water content of the cleaning agent was 20.7% and the bulk density thereof was 0.68 g/ml.

EXAMPLE 18

The same procedure as in Example 15 was followed except that 108 g of tri-iron tetroxide was mixed with 65 g of strontium hydroxide at an atomic ratio of Sr/Fe=1/3, to obtain 120 g of a cleaning agent. The water content of the cleaning agent was 18.5% and the bulk density thereof was 0.75 g/ml.

EXAMPLE 19

To a mixture of 248 g of strontium hydroxide [$Sr(OH)_2 \cdot 8H_2O$] and 54 g of tri-iron tetroxide at an atomic ratio of Sr/Fe=4/3 were added an aqueous solution (70° C.) obtained by dissolving 13 g of sodium hydroxide in 5 g of water and an aqueous solution of 1.7 g of polyvinyl alcohol dissolved in 8 g of water as binders followed by mixing. The cake obtained was extrusion molded by an extrusion molding machine (manufactured by Fuji Poudal K.K.) through a nozzle plate having a nozzle diameter of 1.6 mm, the molded product was cut into pellets having lengths of from about 3 to 5 mm, and the pellets were dried in a dryer by heating to 120° C. for about 12 hours to obtain 154 g of a cleaning agent. The water content of the cleaning agent was 25% by weight and the bulk density was 0.75 g/ml.

The properties of the cleaning agents obtained in Examples 1 to 19 above are shown in Table 1 below.

TABLE 1

| Example | Type of iron oxide | Atomic ratio (Sr/Fe) | Binder | Water content (wt %) | Bulk density (g/ml) |
|---|---|---|---|---|---|
| 1 | $Fe_3O_4$ | 4/3 | NaOH | 14.4 | 0.82 |
| 2 | " | " | KOH | 14.4 | 0.85 |
| 3 | " | " | — | 16.4 | 0.77 |
| 4 | " | " | NaOH | 28.8 | 0.91 |
| 5 | " | 16/3 | " | 14.2 | 0.78 |
| 6 | " | 1/3 | " | 14.8 | 0.85 |
| 7 | " | 4/3 | " | 8.4 | 0.79 |
| 8 | " | " | Sodium Silicate | 16.4 | 0.85 |
| 9 | " | " | NaOH | 0 | 0.70 |
| 10 | FeO | " | " | 15.0 | 0.82 |
| 11 | " | 16/3 | " | 18.0 | 0.80 |
| 12 | " | 1/3 | " | 15.0 | 0.85 |
| 13 | FeO(OH) | 4/3 | " | 16.5 | 0.80 |
| 14 | $Fe_2O_3$ | " | " | 13.5 | 0.82 |
| 15 | $Fe_3O_4$ | " | PVA | 12.6 | 0.68 |
| 16 | " | " | PEG | 18.3 | 0.64 |
| 17 | " | 16/3 | PVA | 20.7 | 0.68 |
| 18 | " | 1/3 | " | 18.5 | 0.75 |
| 19 | FeO | 4/3 | NaOH + PVA | 25.0 | 0.75 |

On each of the cleaning agents prepared in Examples 1 to 19, a cleaning test of a gas containing an acidic gas was performed as follows.

28.4 ml of the cleaning agent was packed (packed length of 100 mm) in a quartz cleaning column having an inside diameter of 19 mm and a length of 200 mm, nitrogen containing 10% by volume of each acidic gas shown in Table 2 below was passed through the column under atmospheric pressure at a flow rate of 170 ml/minute (superficial linear velocity in column LV=1 cm/sec), the breakthrough time was measured, and from the value, the amount of the acidic gas removed per liter of the cleaning agent was obtained.

The breakthrough of the acidic gas was measured using a gas-detecting tube (manufactured by Gas Tec K.K.) for detecting chlorides or for detecting bromides by sampling a part of the gas at the outlet of the cleaning column. The kinds of the cleaning agents and the gases are shown in Table 2 below together with the results obtained.

TABLE 2

| Test No. | Kind of cleaning agent (Example No.) | Kind of acidic gas (concn. 10%) | Breakthrough time (minute) | Amount of acidic gas removed (L/L-agent)* |
|---|---|---|---|---|
| 1 | Example 1 | $BCl_3$ | 154 | 92 |
| 2 | " | $Cl_2$ | 104 | 62 |

TABLE 2-continued

| Test No. | Kind of cleaning agent (Example No.) | Kind of acidic gas (concn. 10%) | Break-through time (minute) | Amount of acidic gas removed (L/L-agent)* |
|---|---|---|---|---|
| 3 | " | HCl | 506 | 303 |
| 4 | " | SiF$_4$ | 100 | 60 |
| 5 | " | WF$_6$ | 68 | 41 |
| 6 | " | HBr | 476 | 285 |
| 7 | " | BF$_3$ | 89 | 53 |
| 8 | Example 2 | BCl$_3$ | 127 | 76 |
| 9 | Example 3 | " | 150 | 90 |
| 10 | Example 4 | " | 157 | 94 |
| 11 | Example 5 | " | 109 | 65 |
| 12 | Example 6 | " | 90 | 54 |
| 13 | Example 7 | " | 132 | 79 |
| 14 | Example 8 | " | 134 | 80 |
| 15 | Example 9 | " | 59 | 35 |
| 16 | Example 10 | " | 103 | 62 |
| 17 | Example 11 | " | 89 | 53 |
| 18 | Example 12 | " | 90 | 54 |
| 19 | Example 13 | " | 80 | 48 |
| 20 | Example 14 | " | 70 | 42 |
| 21 | Example 15 | " | 127 | 76 |
| 22 | Example 16 | " | 112 | 67 |
| 23 | Example 17 | " | 92 | 55 |
| 24 | Example 18 | " | 69 | 41 |
| 25 | Example 19 | " | 179 | 107 |

(*): Liter/liter-cleaning agent

As described above, the cleaning agent of a harmful gas according to the present invention has a large removability of acidic gases and can efficiently and safely remove acidic gases such as boron trichloride, chlorine, hydrogen chloride, hydrogen bromide, boron trifluoride, tungsten hexafluoride, silicon tetrafluoride, hydrogen fluoride, chlorine trifluoride, fluorine, etc., and hence excellent effects can be obtained by using the cleaning agent of the present invention for the cleaning of harmful gases containing acidic gases discharged from a semiconductor production step, etc.

While the invention has been described in detail and with reference to specific embodiments thereof, it will be apparent to one skilled in the art that various changes and modifications can be made therein without departing from the spirit and scope thereof.

What is claimed is:

1. A cleaning agent for removing acidic gases from a harmful gas containing the acidic gases, comprising a molded product of a composition comprising strontium hydroxide and an iron oxide as the main components wherein the cleaning agent contains water in an amount of 5 to 60% by weight based on the total weight of the cleaning agent and wherein the acidic gases are halogen-based acidic gases.

2. A cleaning agent as claimed in claim 1, wherein the mixing ratio of strontium hydroxide and the iron oxide is from 15:1 to 1:12 as the atomic ratio of strontium to iron (Sr:Fe).

3. A cleaning agent as claimed in claim 1, wherein the iron oxide is at least one selected from the group consisting of tri-iron tetroxide, iron(II) oxide, iron(II) hydroxide, iron(III) oxide, and iron(III) hydroxide.

4. A cleaning agent as claimed in claim 3, wherein the content of tri-iron tetroxide in the iron oxide is at least 60% by weight.

5. A cleaning agent as claimed in claim 1, wherein the composition further contains at least one binder selected from the group consisting of sodium hydroxide, potassium hydroxide, sodium silicate, polyvinyl alcohol, polyethylene glycol, polypropylene glycol, and methyl cellulose.

6. A cleaning agent as claimed in claim 5, wherein the amount of the binder is from 0.1 to 20 parts by weight per 100 parts by weight of the composition.

7. A cleaning agent as claimed in claim 1, wherein the acidic gas is at least one gas selected from the group consisting of boron trichloride, chlorine, hydrogen chloride, hydrogen bromide, boron trifluoride, tungsten hexafluoride, silicon tetrafluoride, hydrogen fluoride, chlorine trifluoride, and fluorine.

8. A cleaning agent as claimed in claim 1, wherein the harmful gas is an exhaust gas discharged from a semiconductor production step.

* * * * *